(12) United States Patent
Kumar et al.

(10) Patent No.: US 11,582,217 B2
(45) Date of Patent: Feb. 14, 2023

(54) SECURING AN INJECTION OF A WORKLOAD INTO A VIRTUAL NETWORK HOSTED BY A CLOUD-BASED PLATFORM

(71) Applicant: Microsoft Technology Licensing, LLC, Redmond, WA (US)

(72) Inventors: Abhijeet Kumar, Redmond, WA (US); Aanand Ramachandran, Redmond, WA (US); Jayesh Kumaran, Redmond, WA (US); David Michael Brumley, Bellevue, WA (US); Rishabh Tewari, Sammamish, WA (US); Nisheeth Srivastava, Sammamish, WA (US); Sushant Sharma, Sammamish, WA (US); Deepak Bansal, Bellevue, WA (US); Abhishek Ellore Sreenath, Bangalore (IN); Parag Sharma, Issaquah, WA (US); Abhishek Shukla, Redmond, WA (US); Avijit Gupta, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 63 days.

(21) Appl. No.: 17/344,857

(22) Filed: Jun. 10, 2021

(65) Prior Publication Data
US 2021/0306313 A1 Sep. 30, 2021

Related U.S. Application Data

(62) Division of application No. 16/234,211, filed on Dec. 27, 2018, now Pat. No. 11,038,866.

(30) Foreign Application Priority Data

Sep. 18, 2018 (IN) .............................. 201841035064

(51) Int. Cl.
*G06F 21/71* (2013.01)
*G06F 21/53* (2013.01)
(Continued)

(52) U.S. Cl.
CPC .......... *H04L 63/08* (2013.01); *G06F 9/45533* (2013.01); *G06F 9/468* (2013.01); *H04L 63/108* (2013.01)

(58) Field of Classification Search
None
See application file for complete search history.

(56) References Cited

U.S. PATENT DOCUMENTS 8,782,748 B2 * 7/2014 Olszewski ............ H04L 63/104
726/4
10,554,758 B2 * 2/2020 Barry ...................... H04L 63/08
(Continued)

OTHER PUBLICATIONS

Performance Analysis of Network I/O Workloads in Virtualized Data Centers. Mei. IEEE. (Year: 2013).*
(Continued)

*Primary Examiner* — Venkat Perungavoor
(74) *Attorney, Agent, or Firm* — Newport IP, LLC; Jacob P. Rohwer (57) ABSTRACT

The disclosed system implements techniques to secure communications for injecting a workload (e.g., a container) into a virtual network hosted by a cloud-based platform. Based on a delegation instruction received from a tenant, a virtual network of the tenant can connect to and execute a workload via a virtual machine that is part of a virtual network that belongs to a resource provider. To secure calls and authorize
(Continued)

access to the tenant's virtual network, authentication information provided with a call from the virtual network of the resource provider may need to match authorization information made available via a publication service of the cloud-based platform. Additionally or alternatively, an identifier of a NIC used to make a call may need to correspond to a registered name of the resource provider for the call to be authorized. These checks provide increased security by preventing unauthorized calls to the tenant's virtual network.

20 Claims, 5 Drawing Sheets (51) Int. Cl.
*H04L 9/40* (2022.01)
*G06F 9/46* (2006.01)
*G06F 9/455* (2018.01)
*H04L 12/22* (2006.01)

(56) References Cited

U.S. PATENT DOCUMENTS

| | | | |
|---|---|---|---|
| 2014/0282889 A1* | 9/2014 | Ishaya | G06F 9/5072 726/4 |
| 2015/0193267 A1* | 7/2015 | Shafer | G06F 9/468 719/320 |
| 2016/0094667 A1* | 3/2016 | Jani | H04L 67/10 709/202 |
| 2020/0026580 A1* | 1/2020 | Bahramshahry | G06F 9/5077 |
| 2020/0319907 A1* | 10/2020 | Jain | G06F 9/5072 |
| 2021/0117561 A1* | 4/2021 | Carroll, Jr. | G06F 9/5072 |

OTHER PUBLICATIONS

Heterogeneity and Load Balance in Structured P2P System. Chow. IEEE. (Year: 2002).*

Cloud Based Datacenter Network Acceleration Using FPGA for Data-Offloading. Okafor. JMCN. (Year: 2017).*

Towards Practical Virtual Server-based Load Balancing for Distributed Hash Tables. Chen. IEEE. (Year: 2008).*

* cited by examiner

SECURING AN INJECTION OF A WORKLOAD INTO A VIRTUAL NETWORK HOSTED BY A CLOUD-BASED PLATFORM

PRIORITY APPLICATION

This divisional application claims the benefit of and priority to Non-Provisional application Ser. No. 16/234,211, filed Dec. 27, 2018, titled "Securing an Injection of a Workload into a Virtual Network Hosted by a Cloud-Based Platform," which claims the benefit of and priority to Indian (IN) Provisional Application No. 201841035064, filed Sep. 18, 2018, the entire contents of which are incorporated herein by reference.

BACKGROUND

Cloud-based platforms (e.g., AMAZON WEB SERVICES, MICROSOFT AZURE, etc.) enable tenants (e.g., customers) to use or consume resources (e.g., services) provided by resource providers in their virtual networks. A tenant typically interacts with a top-level control plane application programming interface to implement the resource provisioning. As a result of this interaction, the existing infrastructure of a cloud-based platform requires the resource provider to create a virtual machine that is configured to execute a workload (e.g., a container) inside a tenant's virtual network. As an alternative, the resource provider can coordinate with the tenant to create a secure communication tunnel to execute the workload in the tenant's virtual network. These ways of provisioning resources places a burden on the resource provider and/or the tenant.

It is with respect to these and other technical challenges that the disclosure made herein is presented.

SUMMARY

The techniques described herein secure communications for injecting a workload (e.g., a container, a function, a process, etc.) into a virtual network hosted by a cloud-based platform. Based on a delegation instruction received from a tenant, a virtual network of the tenant can connect to and execute a workload via a virtual machine that is part of a virtual network that belongs to a resource provider. In contrast to conventional techniques, this resource provisioning, or the injection of the workload, is capable of being launched from within the resource provider's virtual network.

As described herein, a tenant delegates control for a portion of their virtual network (e.g., a subnet of IP addresses, an address space, etc.) so that resources provisioned by a separate resource provider (e.g., WEBAPPS, AZURE CONTAINER INSTANCE, etc.) can be injected into the delegated portion of the tenant's virtual network. The resource provider may be part of a service offered by a cloud-based platform. Alternatively, the resource provider may be part of a service offered by a third-party that has registered and/or partnered with the cloud-based platform for resource provisioning purposes. Ultimately, a resource provider is called upon to arrange or direct computing and/or networking components to produce a desired effect within a tenant's virtual network, which may be referred to herein as a "goal state".

As described herein, a cloud-based platform provides the infrastructure to handle network isolation associated with the resource provisioning. Consequently, the resource provider is no longer responsible for creating a virtual machine that is configured to execute a workload (e.g., a container) inside a tenant's virtual network. Moreover, the resource provider can connect to the delegated portion of the tenant's virtual network without requiring any specific network coordination with the tenant. Rather, a resource provider can deploy one of its own virtual machines, operating in its own virtual network, to inject a workload into another virtual network by having the virtual machine call into a supporting host node of the cloud-based platform. In various examples, the call can be a request sent from the resource provider's virtual machine to the supporting host node over a representational state transfer (REST) endpoint. A REST application programming interface (API) can be used as a service endpoint that supports sets of operations (e.g., HTTP operations) which provide, create, retrieve, update, or delete access to the underlying infrastructure of the cloud-based platform.

Since these calls into the supporting host node can make changes to the physical network of the cloud-based platform, it is beneficial to have the calls secured. To secure the calls and authorize access to the tenant's delegated portion of their virtual network, the cloud-based platform is configured to verify information. In one example, authentication information provided in association with the call from the virtual machine of the resource provider may need to correspond to (e.g., match) authorization information made available to the host node via a verified publication service of the cloud-based platform. In another example, an identifier of a network interface controller used to make a call may need to correspond to a registered name of the resource provider (e.g., a name of a service) for the call to be authorized. These checks provide increased security by preventing unauthorized calls from accessing the tenant's virtual network.

To delegate control of a portion of a virtual network, the tenant can provide a name of the resource provider (e.g., a name of the service) that is allowed to inject a workload into the tenant's virtual network. The name can be provided to a component and/or a service of the cloud-based platform with which the tenant is directed to interact (e.g., a tenant-facing component). This component may be referred to herein as a networking resource provider (e.g., "NRP"). The networking resource provider is configured to manage the injection of the workload into the tenant's virtual network via the use of a secure channel within a software-defined network (SDN) stack. In this way, a goal state associated with execution of the workload can be transferred from the networking resource provider to other components on host node(s) supporting the delegated portion of the tenant's virtual network.

Based on the tenant delegation, the networking resource provider can generate authentication information. Moreover, the networking resource provider can forward the tenant's delegation request and/or the authentication information to components of the cloud-based platform so the information can be accessed by host nodes. For instance, one of these components is associated with a publication service and may be referred to as a publication subscription component (e.g., "PUBSUB"). The publication subscription component is configured to publish the delegated control so that it can be accessed by, or pushed down to, cluster-level services and/or individual host nodes of the cloud-based platform. In other words, the cluster-level services and/or the individual host nodes can be made aware of the delegated control.

In various examples, the authentication information comprises an authentication token (e.g., a Base64 encoded string representation of a binary token) that the resource provider submits with each request to access the delegated portion of the tenant's virtual network. For example, when a resource provider receives an instruction from the tenant to provision a resource in the tenant's virtual network, the resource provider talks to the network resource provider and obtains the authorization information generated by the network resource provider based on the initial delegation request provided by the tenant. Moreover, the resource provider registers with the network resource provider, and via this registration, the network interface controllers (NICs) in the resource provider's virtual network are assigned, or stamped with, an identifier that identifies the resource provider (e.g., a name of the service). This registration process may be completed before or after the tenant provides the delegation request to the network resource provider.

When the virtual machine, in the resource provider's virtual network, that is executing the workload calls into a host node, the host node is configured to use the identifier to identify the NIC from which the call came from. The identifier of the NIC is used by the host node to allow or reject the injection of the workload into the tenant's virtual network. That is, if the identifier of the NIC corresponds to a name of the resource provider, the workload executing on a virtual machine in the virtual network of the resource provider is allowed to be injected into the tenant's virtual network, via the delegated subnet. If the identifier of the NIC does not correspond to a name of the resource provider, then the workload executing on the virtual machine in the virtual network of the resource provider is blocked from being injected into the tenant's virtual network.

Additionally or alternatively, the host node can receive the authentication information with a call. The host node compares the authentication information received with the call to the authentication information published via the publication subscription component. If a match exists for the authentication information (e.g., a string match), the workload executing on a virtual machine in the virtual network of the resource provider is allowed to be injected into the tenant's virtual network, via the delegated subnet. If a match does not exist for the authentication information, then the workload executing on the virtual machine in the virtual network of the resource provider is blocked from being injected into the tenant's virtual network. If the injection is authorized, a host network agent can work with a virtual switch running on the host node to implement packet transformations, packet routing, policies, access control lists (ACLs), etc. associated with the resource provisioning.

By securing the calls, as described above, a resource provider can issue a command to create a workload, for a tenant's virtual network, from within the resource provider's own virtual network, and the infrastructure of the cloud-based platform handles the network isolation to implement the injection. In other words, a virtual machine in the resource provider's virtual network is configured to act as a network controller and define the workload to be executed on its own virtual network.

In some implementations, the injection can be implemented by partitioning a NIC of a virtual machine into multiple channels and associating different policies with each channel. This partitioning allows the communication with the host node for an injected workload over one channel of the NIC and the execution of other workloads belonging to other tenants of the virtual machine over other channels of the NIC. In other words, via the use of a partitioned NIC, multi-tenancy virtual machines are enabled (e.g., different containers that are part of different virtual networks can be operating on the same virtual machine).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The techniques described herein enable a tenant to delegate control over a portion of their virtual network (e.g., a subnet of IP addresses, an address space, etc.) so that resources provisioned by a separate resource provider can be injected into the portion of the virtual network (e.g., "VNET"). A resource provider may be referred to as an orchestrator, or an orchestrator resource provider (e.g., "ORP"), because the resource provider "orchestrates" the provisioning of resources, or the injection of a workload into the tenant's virtual network. The resource provider may be part of a service offered by a cloud-based platform. Alternatively, a resource provider may be part of a service offered by a third-party that has registered and/or partnered with the cloud-based platform for resource provisioning purposes. Ultimately, a resource provider is called upon to arrange or direct computing and/or networking components to produce a goal state.

In various examples, a virtual network is a representation of a tenant's own network in a cloud-based platform (e.g., AMAZON WEB SERVICES, MICROSOFT AZURE, etc.). In some instances, the virtual network can be an extension of the tenant's own private network (e.g., an on-premises datacenter network). A virtual network can implement one or more virtual machines. Via the delegation described herein, a tenant's virtual network can connect to a workload (e.g., a container, a function, a process, etc.) via another virtual machine executing in another virtual network. That is, based on a resource provisioning request from a tenant, a virtual machine in a resource provider's virtual network can inject a workload into a tenant's virtual network, but not necessarily into a tenant's virtual machine within the tenant's virtual network. As described above, this injection of the workload can be launched from within the resource provider's virtual network.

In various examples, a virtual machine provides functionality to execute an operating system. A hypervisor in the cloud-based platform can use the functionality to share and manage hardware, allowing for multiple isolated environments to exist on a same physical machine (e.g., a server that is part of the cloud-based platform). A physical machine that is part of the cloud-based platform may be referred to herein as a host node.

In further examples, a container can exist on a virtual machine. A container is an isolated and resource-controlled operating environment. A software application can run in a container without affecting the rest of the system and without the system affecting the application. A container may be specific to one application, or may provide the runtime for multiple applications, providing additional operating system functions and services (e.g. input/output functions, security, etc.). Moreover, a container can be portable and/or mobile. Containers introduce additional levels of abstraction to a network (e.g., a datacenter network operated by a cloud-based platform), thereby increasing the complexity of the networking infrastructure. In a specific example, a host node may have a physical Internet Protocol (IP) address and a virtual machine executing within the host node may have a virtual IP address. Network Virtualization Functions (NVF) in the host node may be used to encapsulate and/or de-encapsulate ("encap/decap") packets or to translate addresses from one layer of abstraction to another and/or between physical and virtual layers.

The cloud-based platform described herein provides the infrastructure to handle network isolation associated with the resource provisioning. Accordingly, the resource provider is no longer responsible for creating a container inside a tenant's virtual network. Moreover, the resource provider can connect to the portion of the tenant's virtual network for which the resource provider has delegated control without requiring any specific network coordination with the tenant. Consequently, the techniques described herein use component(s) of a host node that are configured to provide virtualized networking functions, such as routing, switching, bridging, firewall functions, network address translation (NAT), encap/decap, load balancing, Dynamic Host Configuration Protocol (DHCP), name resolution service (e.g., DNS resolution), etc.

A resource provider can deploy one of its virtual machines to inject a workload into another virtual network by having the virtual machine call into a supporting host node. In various examples, the workload can be executed in a container. In further examples, the workload can comprise a process executing on the resource provider's virtual machine implemented within the resource provider's virtual network. The call can be a request sent from the resource provider's virtual machine to the supporting host node over a representational state transfer (REST) endpoint. A REST application programming interface (API) can be used as a service endpoint that supports sets of operations (e.g., HTTP operations) which provide, create, retrieve, update, or delete access to the underlying infrastructure of the cloud-based platform.

Since these types of calls into the supporting host node can make changes to the physical network of the cloud based-platform, it is beneficial to have the calls secured. The security described herein can include two parts. First, authentication information provided in association with the call from the virtual machine may be required to match authorization information accessible to the host node for the call to be authorized. Second, an identifier of a network interface controller (NIC) from which a call is received may be required to correspond to a registered name of the resource provider (e.g., a name of a service) for the call to be authorized. In some implementations, only one of the authentication information or the identifier of the NIC may be used to secure the calls.

In various examples, the publication service of the cloud-based platform can expire or invalidate the authentication information for various reasons. This provides an added element of security in case a resource provider's virtual network and/or virtual machine becomes compromised, for example. In further examples, the component can continually validate or refresh the authentication information at a predetermined time interval (e.g., every hour, every three hours, every twenty-four hours, etc.) for additional security.

By securing the calls, as described above, a resource provider can issue a command to create a workload, for a tenant's virtual network, from within the resource provider's own virtual network, and the networking infrastructure of the cloud-based platform is configured to handle the network isolation to implement the injection. In other words, a virtual machine of the resource provider is enabled to act as a network controller and define the workload to execute on its own virtual network, yet the workload is injected into a portion of a tenant's virtual network for which control has been delegated to the resource provider. Conventionally, policies were implemented from a top-down architecture based on assignments from outside the virtual network of the resource provider.

Figure 1:
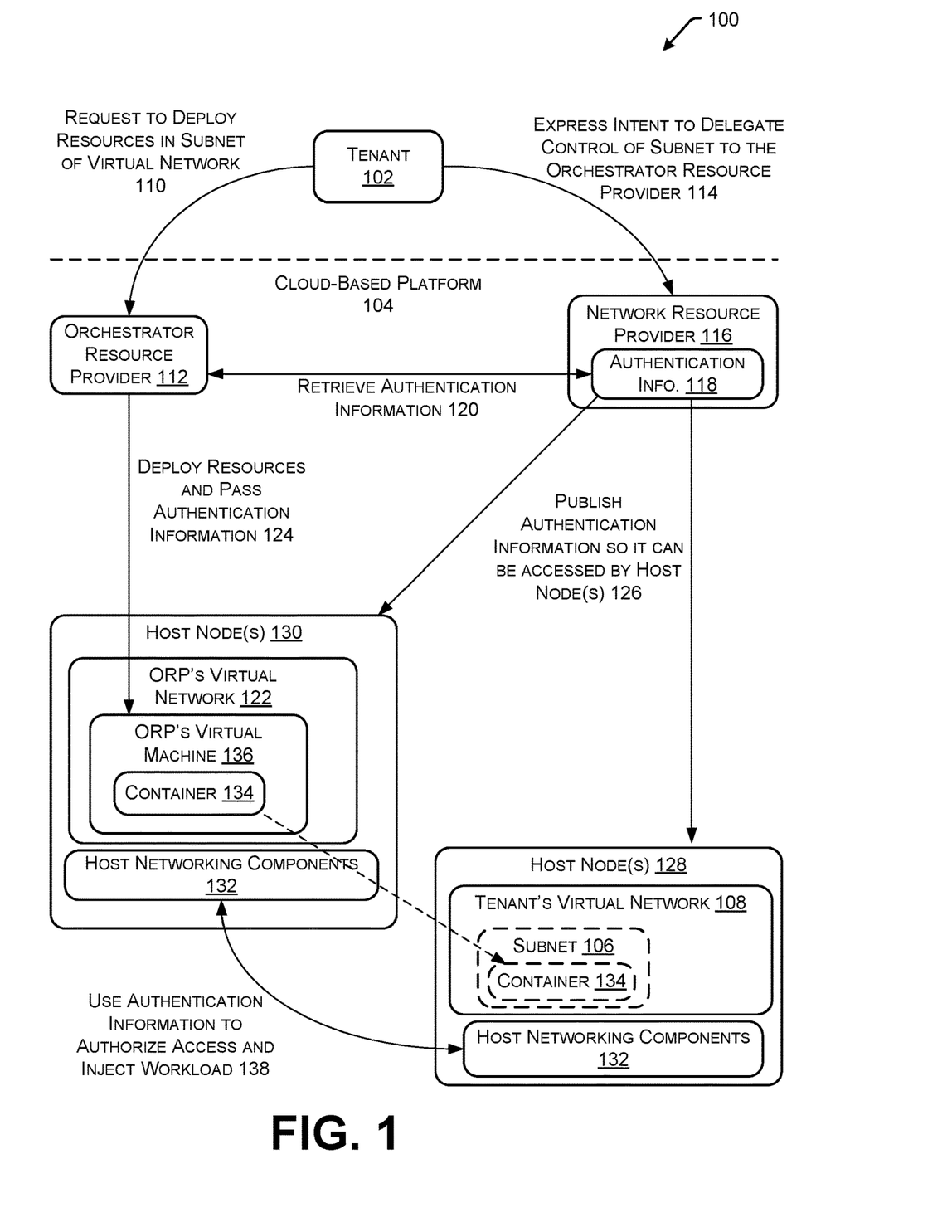
FIG. 1 illustrates an example environment in which a tenant can provide a request, to a cloud-based platform, to have a workload executing in a virtual network of a resource provider injected into a delegated portion of a virtual network of the tenant (e.g., a subnet), and the injection is allowed using authentication information.

FIG. 1 illustrates an example environment 100 in which a tenant 102 provides a request, to a cloud-based platform 104, to have a workload executing in a virtual network of a resource provider injected into a delegated portion of a virtual network of the tenant (e.g., a subnet). In this example environment 100, the injection is allowed using authentication information. In FIG. 1, the tenant 102 provides a request to deploy resources in a subnet 106 of the tenant's virtual network 108, as referenced by 110. The tenant 102 provides the request to an orchestrator resource provider 112 of the cloud-based platform 104. Accordingly, the request identifies the tenant's virtual network 108 and the subnet 106 for which control is to be delegated to the orchestrator resource provider 112 so that the orchestrator resource provider can provision the resources.

As referenced by 114, the tenant 102 also expresses an intent to delegate control of the subnet 106 to the orchestrator resource provider 112 by calling into the network resource provider 116, which is a component of the cloud-based platform 104. The network resource provider 116 is configured to generate authentication information 118 based on the tenant's expressed intent to delegate control of the subnet 106 to the orchestrator resource provider 112. In various examples, the authentication information comprises an authentication token such as a Base64 encoded string representation of a binary token.

Based on reception of the request to deploy resources, the orchestrator resource provider 112 retrieves a version of the authorization information 118 generated by the network resource provider 116, as referenced by 120. Moreover, the orchestrator resource provider 112 causes its own resources to be deployed based on reception of the request, and passes down the retrieved authentication information 118 to its own virtual network 122, as referenced by 124.

Meanwhile, the network resource provider 116 causes the authentication information 118 to be published (e.g., via a publication service), as referenced by 126, so that the authentication information 118 can be accessed by host node(s) 128. That is, the authentication information 118 can be pushed down by the publication service to the host node(s) 128 that support the tenant's virtual network 108, or alternatively, the authentication information 118 can be retrieved from the publication service by the host node(s) 128. Furthermore, the authentication information 118 can also be accessed by host node(s) 130 that support the orchestrator resource provider's virtual network 122.

Using the authentication information 118, host networking components 132 of the host node(s) 128 and/or 130 can authorize access and manage the injection of the workload (e.g., a container 134), executing on a virtual machine 136 in the orchestrator resource provider's virtual network 122, into the subnet 106 of the tenant's virtual network 108, as referenced by 138. For instance, the authentication information 118 received in a call from the orchestrator resource provider's virtual machine 136 can be used to allow or reject a request to access the subnet 106 of the tenant's virtual network 108. That is, if the authentication information received in the call matches the authentication information accessed via the publication service (e.g., the publication subscription component), then access to the subnet 106 of the tenant's virtual network 108 is allowed (e.g., authorized) by the host networking components 132. Conversely, if the authentication information received in the call does not match the authentication information accessed via the publication service, then access to the subnet 106 of the tenant's virtual network 108 is rejected (e.g., not authorized) by the host networking components 132. In various examples, the call can be a REST call to a service endpoint that supports sets of operations (e.g., HTTP operations) which provide, create, retrieve, update, or delete access to the underlying infrastructure of the cloud-based platform 104.

Figure 2:
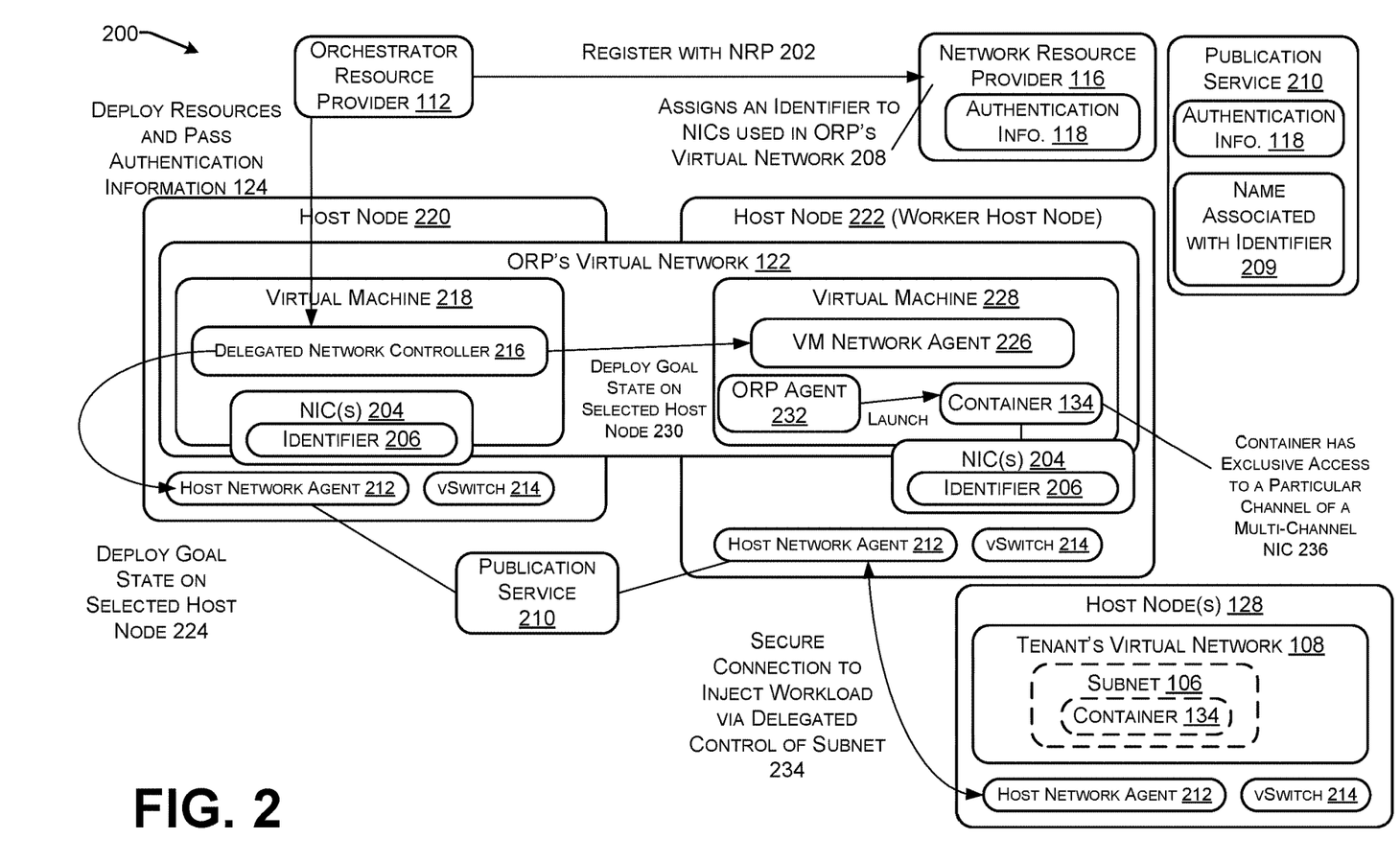
FIG. 2 illustrates an example environment in which a tenant can provide a request, to a cloud-based platform, to have a workload executing in a virtual network of a resource provider injected into a delegated portion of a virtual network of the tenant, and the injection is allowed using identifiers of network interface controllers (NICs).

FIG. 2 illustrates another example environment 200 in which a tenant can provide a request, to a cloud-based platform, to have a workload executing in a virtual network of a resource provider injected into a delegated portion of a virtual network of the tenant. In the example environment 200 of FIG. 2, the injection is allowed using identifiers of network interface controllers (NICs). As shown, the orchestrator resource provider 112 registers with the network resource provider 116, as referenced by 202. As part of this registration process, the network resource provider 116 locates network interface controllers 204 deployed in the orchestrator resource provider's virtual network 122 and assigns an identifier 206 to the network interface controllers (NICs) 204, as referenced by 208. The identifier 206 identifies a name of the orchestrator resource provider 112 and/or a name of a service known to be provided by the orchestrator resource provider 112.

As described above, the network resource provider 116 also generates authentication information 118 and passes the authentication information 118 and/or the name 209 associated with the identifier 206 to a publication service 210. In various examples, the publication service 210 includes a publication subscription component (e.g., a "PUBSUB" component). In this way, the authentication information 118 and/or the identifier 206 of the NIC(s) 204 can be accessed by the host nodes, such as host nodes 128 that support the tenant's virtual network 108. In other words, the publication service 210 can make the host networking components (e.g., host networking agents 212, virtual switches 214, etc.) aware of the authentication information 118 and/or the name 209.

As described in FIG. 1, the orchestrator resource provider 112 provides a request to deploy resources and passes the authentication information 118 to its own virtual network 122, as referenced by 124. In further illustrated in the example of FIG. 2, the request and the authentication information 118 are sent to a delegated network controller 216 operating on a first virtual machine 218 in the orchestrator resource provider's virtual network 122. The first virtual machine 218 may be supported by a first host node 220 (e.g., one of host nodes 130 in FIG. 1) of the cloud-based platform 104. The delegated network controller 216 is configured to deploy a goal state based on resources to be provisioned (e.g., a workload). As part of this deployment, the delegated network controller 216 may be configured to select a second host node 222 (e.g., the "worker" host node) on which to execute the workload. This goal state can be communicated to the host network agent 212 of the host node 220 on which the delegated network controller's virtual machine 218 is executing, as referenced by 224. Moreover, this goal state can be communicated to a VM network agent 226 (e.g., a container network service or "CNS") on a virtual machine 228 executing on the worker host node 222, as referenced by 230.

In various examples, the VM network agent 226 then causes an ORP agent 232 to launch the workload (e.g., the container 134). When executing, the container 134 may make calls into the host networking components (e.g., host networking agent 212, vSwitch 214, etc.). The host networking components can authorize access and manage the injection of the workload, executing on a virtual machine 228 in the orchestrator resource provider's virtual network 122, into the subnet 106 of the tenant's virtual network 108. For instance, the identifier 206 of the NIC from which the call is received can be used to allow or reject a request to access the subnet 106 of the tenant's virtual network 108. That is, if the identifier 206 corresponds to a name 209 of the orchestrator resource provider which is known to have been delegated control of the subnet, then access to the subnet 106 of the tenant's virtual network 108 is allowed (e.g., authorized). Conversely, if the identifier 206 does not correspond to a name 209 of the orchestrator resource provider which is known to have been delegated control of the subnet 106, then access to the subnet 106 of the tenant's virtual network 108 is rejected. Therefore, using the authentication information 118 and/or the identifier 206, a secure connection to inject a workload into the subnet 106 can be established by networking components of host nodes in the cloud-based platform, as referenced by 234.

In various examples, the NIC 204 used by the container 134 can be partitioned into multiple channels. This partitioning allows the communication with the host node for an injected workload over a particular channel of the NIC 204 and the execution of other workloads belonging to other tenants of the virtual machine over other channels of the NIC 204. In this way, multi-tenancy virtual machines are enabled (e.g., different containers that are part of different virtual networks can be operating on the same virtual machine). Consequently, in some embodiments, the identifier 206 may be associated with a particular channel of the NIC 204 and the container 134 has exclusive access to the particular channel of the NIC 204, as referenced by 236.

Figure 3:
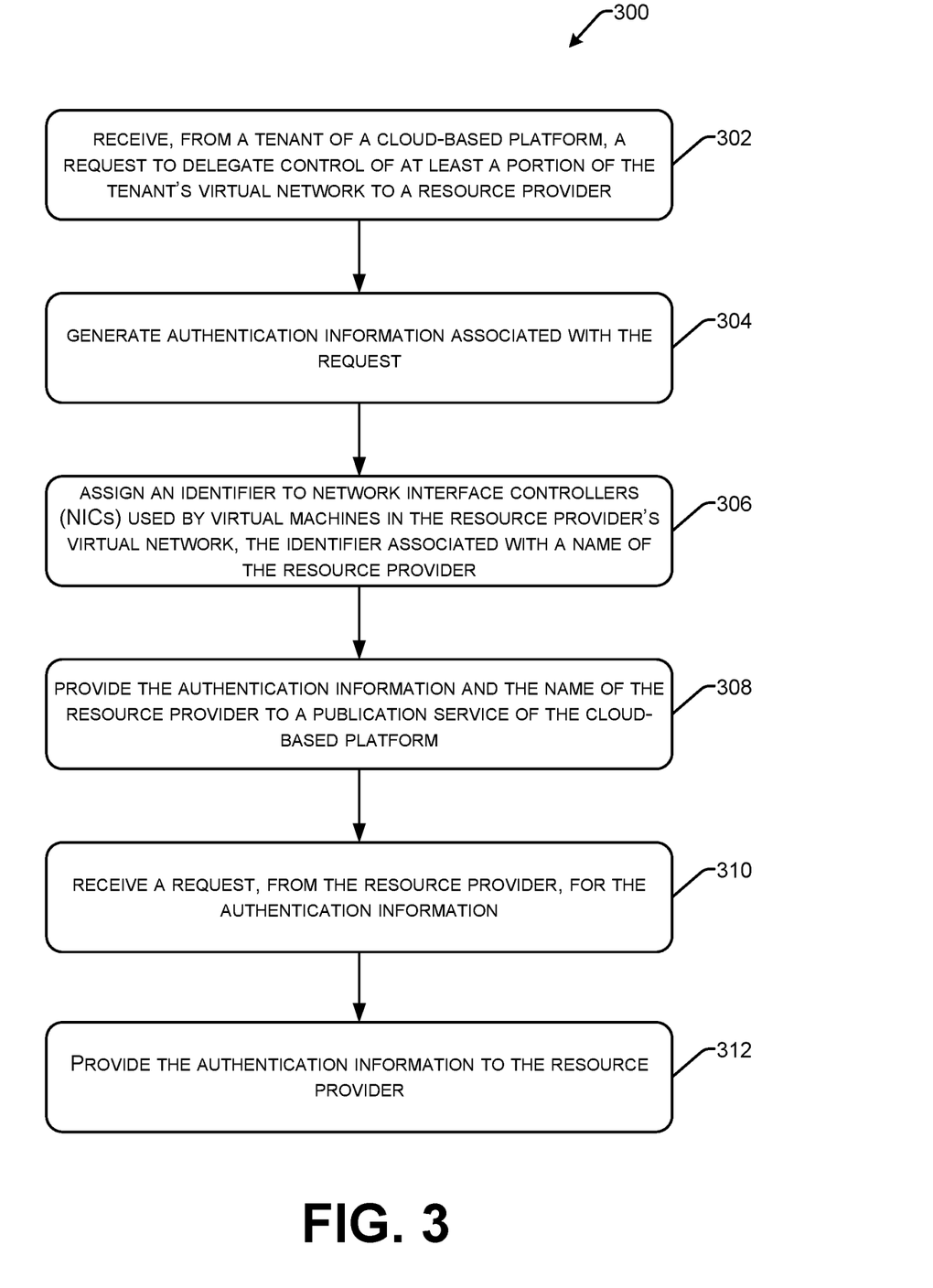
FIG. 3 is a flowchart that illustrates operations for injecting a workload, executing in a virtual network of a resource provider, into a delegated portion of a virtual network of the tenant.
Figure 4:
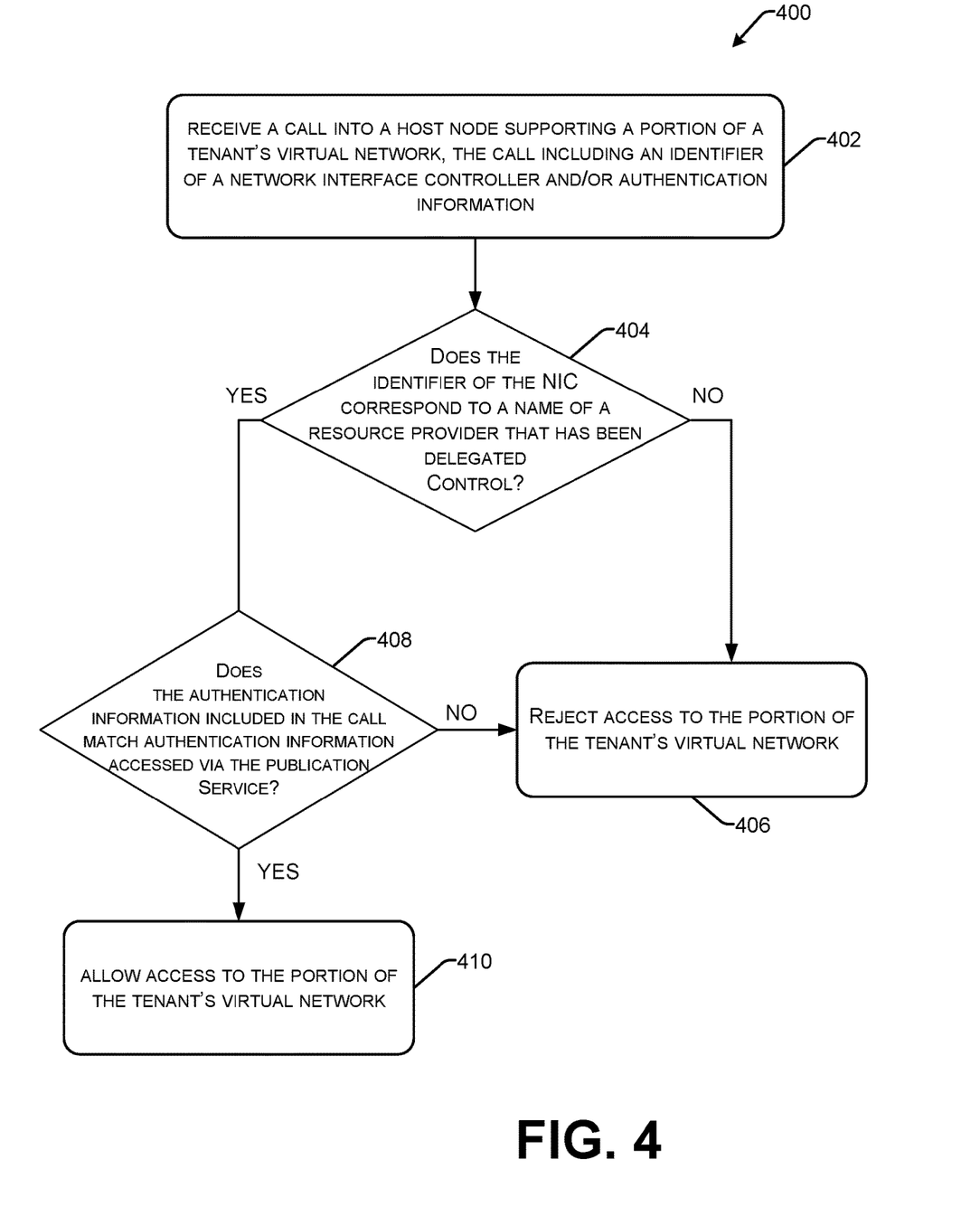
FIG. 4 is a flowchart that illustrates operations for securing the injection of a workload, executing in a virtual network of a resource provider, into a delegated portion of a virtual network of the tenant.

FIGS. 3 and 4 each illustrates an example flowchart. It should be understood by those of ordinary skill in the art that the operations of the method(s) disclosed herein are not necessarily presented in any particular order and that performance of some or all of the operations in alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated method(s) can end at any time and need not be performed in their entirety. Some or all operations of the method(s), and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 3 is a flowchart 300 that illustrates operations for injecting a workload, executing in a virtual network of a resource provider, into a delegated portion of a virtual network of the tenant. In various examples, the operations in FIG. 3 may be performed by the networking resource provider of the cloud-based platform.

At operation 302, the cloud-based platform receives, from a tenant, a request to delegate control of a portion of the tenant's virtual network (e.g., a subnet) to a resource provider (e.g., an orchestrator resource provider).

At operation 304, the cloud-based platform generates authentication information associated with the request. For example, the authentication information can comprise an authentication token (e.g., a Base64 encoded string representation of a binary token).

At operation 306, the cloud-based platform assigns an identifier to network interface controllers (NICs) used by virtual machines in the resource provider's virtual network. The identifier corresponds to a name of the resource provider, or a name of a service offered by the resource provider. In some instances, the identifier is the name.

At operation 308, the cloud-based platform provides the authentication information and the name to a publication service so that the authentication information and the name can be accessed by host nodes handling the network communications required to inject a workload.

At operation 310, the cloud-based platform receives a request, from the resource provider, for the authentication information.

At operation 312, the cloud-based platform provides the authentication information to the resource provider based on the received request.

FIG. 4 is a flowchart 400 that illustrates operations for securing the injection of a workload, executing in a virtual network of a resource provider, into a delegated portion of a virtual network of the tenant. In various examples, the operations in FIG. 4 may be performed by networking components on host nodes of the cloud-based platform.

At operation 402, the cloud-based platform receives a call into a host node supporting a portion of the tenant's virtual network. The call may include an identifier of a NIC and/or authentication information.

At operation 404, it is determined whether the identifier of the NIC corresponds to a name of the resource provider that has been delegated control of the portion of the tenant's virtual network. If "no" at operation 404, then the process proceeds to operation 406 where access to the portion of the tenant's virtual network is rejected (e.g., prevented, denied, prohibited). That is, the workload being executed via the call is not allowed to be injected into the tenant's virtual network.

If "yes" at operation 404, then the process proceeds to operation 408 where it is determined whether the authentication information included in the call matches authentication information accessed via a publication service of the cloud-based platform. If "no" at operation 408, then the process proceeds to operation 406 where access to the portion of the tenant's virtual network is rejected.

If "yes" at operation 408, then the process proceeds to operation 410 where access to the portion of the tenant's virtual network is allowed and the workload executing on a virtual machine in the resource provider's virtual network can be injected into the portion of the tenant's virtual network.

Figure 5:
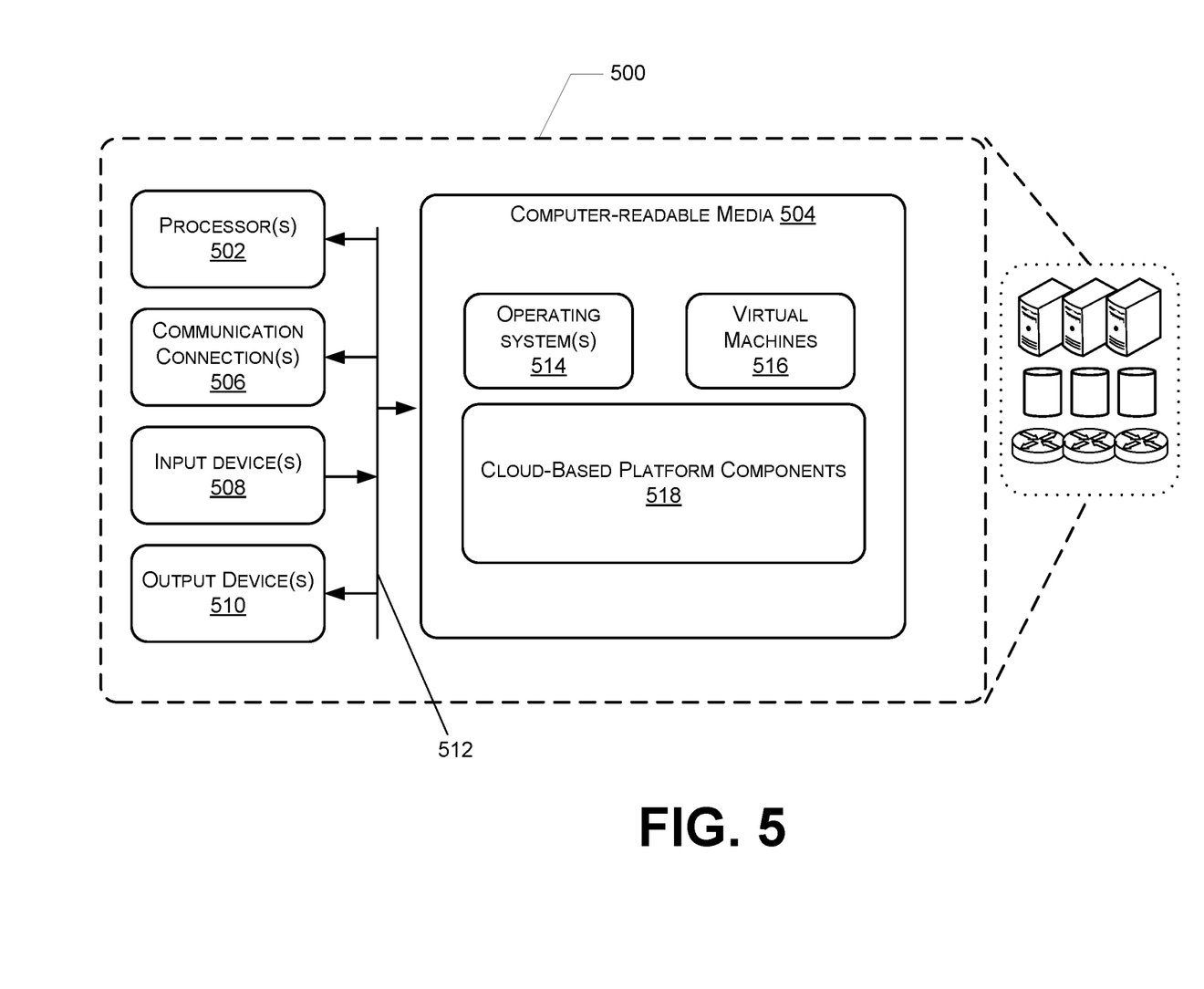
FIG. 5 is a block diagram of an example computing system usable to implement various aspects of the present disclosure.

FIG. 5 is a block diagram of an example computing system 500 usable to implement various aspects of the present disclosure. The computing system 500 may be deployed in a shared network environment, including in a datacenter, a cloud computing environment, or other network of computing devices. In one example configuration, the computing system 500 comprises at least one processor 502 and computer-readable media 504. The computing system 500 also contains communication connection(s) 506 that allow communications with various other systems. The computing system 500 may also include one or more input devices 508, such as a keyboard, mouse, pen, voice input device, touch input device, etc., and/or one or more output devices 510, such as a display (including a touch-screen display), speakers, printer, etc. coupled communicatively to the processor(s) 502 and the computer-readable media 504 via connections 512.

In the illustrated example, computer-readable media 504 stores operating system(s) 514, which provide basic system functionality to virtual machines 516 (which may be the same as or similar to one or more of virtual machines described above) and/or other cloud-based platform components 518 (e.g., networking resource provider, the publication service, the networking switch, the SDN controller, APIs, NICs, etc.).

The operations described herein can be implemented via computer-executable instructions stored on one or more computer storage media that, when executed by one or more processors, enable the one or more processors to perform the operations. Generally, computer-executable instructions include routines, programs, objects, modules, components, data structures, and the like that perform particular functions or implement particular abstract data types.

According to various examples, the computing systems described herein includes one or more devices, such as servers, storage devices, and other cloud-based platform devices. Computer-readable media 504 stores computer-executable instructions that are loadable and executable by one or more processor(s), as well as data generated during execution of, and/or usable in conjunction with, these programs. In the illustrated example, computer-readable media stores operating system instances, which provide basic system functionality to applications stored thereon. One or more of these components, including the operating systems, may be instantiated as virtual machines, containers, or as some other type of virtualized instantiation.

Processor(s) 502 may include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative examples one or more functions of the present disclosure may be performed or executed by, and without limitation, hardware logic components including Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), Digital Signal Processing unit(s) (DSPs), and other types of customized processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, examples of the computing systems may include a plurality of processing units of multiple types. Different processing units may have different execution models, e.g., as is the case for graphics processing units (GPUs) and central processing units (CPUs).

Depending on the configuration and type of computing device used, computer-readable media include volatile memory (such as random access memory (RAM)) and/or non-volatile memory (such as read-only memory (ROM), flash memory, 3D XPoint, resistive RAM, etc.). The computer-readable media can also include additional removable storage and/or non-removable storage including, but not limited to, SSD (e.g., flash memory), HDD (Hard Disk Drive) storage or other type of magnetic storage, optical storage, and/or other storage that can provide non-volatile storage of computer-executable instructions, data structures, program modules, and other data for computing systems.

Computer-readable media can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, programming modules, or other data. Computer storage media includes, but is not limited to, phase change memory (PRAM), resistive RAM, 3D Xpoint non-volatile memory, static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Various processes described herein are carried out as computing functions in conjunction with networking functions. For example, one computing device or system may cause transmission of a message to another computing device via network interface hardware. This may include, for example, passing by a software module a pointer, argument, or other data to a networking module. The pointer, argument or other data may identify data stored in memory or in a register that is to be transmitted to another computing device. The networking module may include a protocol stack, and may read the data identified by the pointer, argument, or other data. The protocol stack may encapsulate the data in one or more frames, packets, cells, or other data networking protocol structures. The protocol stack may call a network interface device driver, to cause physical transmission of electrical, magnetic, or optical signals along a communication medium to a network element, such as a gateway, router, switch, hub, and so forth. An underlying network may route or switch the data to the destination. The destination computing device may receive the data via a network interface card, which results in an interrupt being presented to a device driver. A processor of the destination computing device passes the device driver an execution thread, which causes a protocol stack to de-encapsulate the data in the packets, frames, and cells in which the data was received. The protocol stack causes the received data to be stored in a memory, a register, or other location. The protocol stack may pass a pointer, argument, or other data that identifies where the received data is stored to a destination software module executing on the destination computing device. The software module receives an execution thread along with the argument, pointer, or other data, and reads the data from the identified location.

Illustrative Configurations

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including listed all features and potentially including addition of other features that are not listed.

The disclosure presented herein also encompasses the subject matter set forth in the following clauses.

Example Clause A, a method comprising: receiving, from a container executing on a virtual machine in a first virtual network that belongs to a resource provider, a call into a host node supporting a portion of a second virtual network that belongs to a tenant of a cloud-based platform, the call including authentication information generated based at least in part on a request from the tenant to delegate control of the portion of the second virtual network to the resource provider; determining, by one or more processors, that the authentication information included in the call matches authentication information accessed via a publication service of the cloud-based platform; and allowing the container to be injected into the portion of the second virtual network based at least in part on the determining that the authentication information included in the call matches the authentication information accessed via the publication service.

Example Clause B, the method of Example Clause A, further comprising: assigning an identifier to one or more network interface controllers used by virtual machines in the first virtual network, wherein the identifier corresponds to a name of the resource provider; and determining, based at least in part on the identifier, that the call is received from a network interface controller of the one or more network interface controllers, wherein the allowing the container to be injected into the portion of the second virtual network is further based at least in part on the determining that the call is received from the network interface controller of the one or more network interface controllers.

Example Clause C, the method of Example Clause A or Example Clause B, wherein the portion of the second virtual network comprises a subnet of Internet Protocol (IP) addresses.

Example Clause D, the method of any one of Example Clauses A through C, wherein the authentication information comprises an encoded string representation of a binary token.

Example Clause E, the method of any one of Example Clauses A through D, further comprising: determining that the first virtual network has been compromised; and invalidating the authentication information based at least in part on the determining that the second virtual network has been compromised.

Example Clause F, the method of any one of Example Clauses A through D, further comprising: determining that a predetermined time period has expired; and invalidating the authentication information based at least in part on the determining that the predetermined time period has expired.

Example Clause G, the method of any one of Example Clauses A through F, wherein the call comprises a request sent from the container to the host node over a representational state transfer endpoint.

Example Clause H, the method of any one of Example Clauses A through G, wherein the container is part of a service offered by the cloud-based platform.

Example Clause I, the method of any one of Example Clauses A through G, wherein the resource provider comprises a third-party resource provider authorized to provide a service to tenants of the cloud-based platform, and the container is part of the service.

Example Clause J, the method of any one of Example Clauses A through I, wherein the container is injected into the portion of the second virtual network over a particular channel of a network interface controller, the network interface controller being partitioned into multiple channels.

Example Clause K, a system comprising: one or more processors; and computer-readable media storing instructions that, when executed by the one or more processors, cause the system to: receive, as part of a workload executing on a virtual machine in a first virtual network of a cloud-based platform that is operated by a resource provider, a call into a host node supporting a portion of a second virtual network that is operated by a tenant of the cloud-based platform, the call including an encoded string representation of a binary token; determine that the encoded string representation of the binary token included in the call matches an encoded string representation of a binary token accessed via a publication service of the cloud-based platform; and allow the workload to be injected into the portion of the second virtual network based at least in part on the determining that the encoded string representation of the binary token included in the call matches the encoded string representation of the binary token accessed via the publication service.

Example Clause L, the system of Example Clause K, wherein the workload comprises one of a container, a process, or a function.

Example Clause M, the system of Example Clause K or Example Clause L, wherein the portion of the second virtual network comprises a subnet of Internet Protocol (IP) addresses.

Example Clause N, the system of any one of Example Clauses K through M, wherein the instructions further cause the system to: determine that the first virtual network has been compromised; and invalidate the encoded string representation of the binary token based at least in part on the determining that the first virtual network has been compromised.

Example Clause O, the system of any one of Example Clauses K through N, wherein the call comprises a request sent to the host node over a representational state transfer endpoint.

Example Clause P, the system of any one of Example Clauses K through O, wherein the workload is part of a service offered by the cloud-based platform.

Example Clause Q, the system of any one of Example Clauses K through O, wherein the resource provider comprises a third-party resource provider authorized to provide a service to tenants of the cloud-based platform.

Example Clause R, the system of any one of Example Clauses K through Q, wherein the workload is injected into the portion of the second virtual network over a particular channel of a network interface controller, the network interface controller being partitioned into multiple channels.

Example Clause S, a system comprising: one or more processors; and computer-readable media storing instructions that, when executed by the one or more processors, cause the system to: receive, as part of a workload executing on a virtual machine in a first virtual network of a cloud-based platform, a call into a host node supporting a portion of a second virtual network that is operated by a tenant of the cloud-based platform, the call including an identifier of a network interface controller used to make the call; determine that the identifier included in the call corresponds to a name of a resource provider that has been delegated control of the portion of the second virtual network; and allow the workload to be injected into the portion of the second virtual network based at least in part on the determining that the identifier included in the call corresponds to the name of the resource provider that has been delegated control of the portion of the second virtual network.

Example Clause T, the system of Example Clause S, wherein the identifier is associated with a particular channel of a multi-channel network interface controller.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or the claims may be used to distinguish between two different instances of the same element (e.g., two different users, two different virtual machines, etc.).

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A system comprising: one or more processors; and computer storage media storing instructions that, when executed by the one or more processors, cause the system to: receive, from a tenant of a cloud-based platform, a request to delegate control of a portion of a first virtual network, that is operated by the tenant, to a resource provider; receive, as part of a workload executing on a virtual machine in a second virtual network that is operated by the resource provider, another request at a host node supporting the portion of the first virtual network that is operated by the tenant, the request including an identifier of a network interface controller, associated with the resource provider, that is used to make the other request; determine that the identifier included in the other request is registered to a name of the resource provider that has previously been delegated control of the portion of the first virtual network via the request; and allow the workload to be securely injected into the portion of the first virtual network based at least in part on the determining that the identifier included in the other request is registered to the name of the resource provider that has previously been delegated control of the portion of the first virtual network via the request.

2. The system of claim 1, wherein the determining that the identifier included in the other request is registered to the name of the resource provider that has previously been delegated control of the portion of the first virtual network via the request is implemented by accessing a publication service that associates the name of the resource provider with the identifier.

3. The system of claim 1, wherein the identifier is associated with a particular channel of a multi-channel network interface controller.

4. The system of claim 1, wherein the portion of the first virtual network comprises a subnet of Internet Protocol (IP) addresses.

5. The system of claim 1, wherein the other request comprises a call sent from the workload to the host node over a representational state transfer endpoint.

6. The system of claim 1, wherein the workload comprises one of a container, a process, or a function.

7. The system of claim 1, wherein the workload is part of a service offered by the cloud-based platform.

8. The system of claim 1, wherein the resource provider comprises a third-party resource provider authorized to provide a service to tenants of the cloud-based platform.

9. The system of claim 1, wherein the instructions further cause the system to assign the identifier to the name of the resource provider based on a registration request from the resource provider to the cloud-based platform.

10. A method comprising:
receiving, from a tenant of a cloud-based platform, a request to delegate control of a portion of a first virtual network, that is operated by the tenant, to a resource provider;
receiving, as part of a workload executing on a virtual machine in a second virtual network that is operated by the resource provider, another request at a host node supporting the portion of the first virtual network that is operated by the tenant, the request including an identifier of a network interface controller, associated with the resource provider, that is used to make the other request;
determining, by one or more processors, that the identifier included in the other request corresponds to a name of the resource provider that has previously been delegated control of the portion of the first virtual network via the request; and
allowing the workload to be securely injected into the portion of the first virtual network based at least in part on the determining that the identifier included in the other request corresponds to the name of the resource provider that has previously been delegated control of the portion of the first virtual network via the request.

11. The method of claim 10, wherein the determining that the identifier included in the other request corresponds to the name of the resource provider that has been delegated control of the portion of the first virtual network is implemented by accessing a publication service that registers the name of the resource provider with the identifier.

12. The method of claim 10, wherein the identifier is associated with a particular channel of a multi-channel network interface controller.

13. The method of claim 10, wherein the portion of the first virtual network comprises a subnet of Internet Protocol (IP) addresses.

14. The method of claim 10, wherein the other request comprises a call sent from the workload to the host node over a representational state transfer endpoint.

15. The method of claim 10, wherein the workload comprises one of a container, a process, or a function.

16. The method of claim 10, wherein the workload is part of a service offered by the cloud-based platform.

17. The method of claim 10, wherein the resource provider comprises a third-party resource provider authorized to provide a service to tenants of the cloud-based platform.

18. The method of claim 10, further comprising:
receiving a further request to register the name of the resource provider with the cloud-based platform; and
assigning the identifier to the network interface controller based on the further request.

19. One or more computer-readable storage media storing instructions that, when executed by one or more processors, cause the system to perform operations comprising:
receiving, from a tenant of a cloud-based platform, a request to delegate control of a portion of a first virtual network, that is operated by the tenant, to a resource provider;
receiving, as part of a workload executing on a virtual machine in a second virtual network that is operated by the resource provider, another request at a host node supporting the portion of the first virtual network that is operated by the tenant, the request including an identifier of a network interface controller, associated with the resource provider, that is used to make the other request;
determining that the identifier included in the other request corresponds to a name of the resource provider that has previously been delegated control of the portion of the first virtual network via the request; and
allowing the workload to be securely injected into the portion of the first virtual network based at least in part on the determining that the identifier included in the other request corresponds to the name of the resource provider that has previously been delegated control of the portion of the first virtual network via the request.

20. The one or more computer-readably storage media of claim 19, wherein the determining that the identifier included in the other request corresponds to the name of the resource provider that has been delegated control of the portion of the first virtual network is implemented by accessing a publication service that registers the name of the resource provider with the identifier.

* * * * *